April 1, 1969    O. W. PERIN, JR    3,436,155
DRILLING AND TAPPING AID IN THE FORM OF AN APERTURED
CARD HAVING A REFLECTIVE AND MAGNETIC FACE
Filed Oct. 18, 1965

INVENTOR.
OLIVER W. PERIN, JR.
BY
J. Warren Kinney, Jr.
ATTORNEY 3,436,155
DRILLING AND TAPPING AID IN THE FORM OF
AN APERTURED CARD HAVING A REFLECTIVE
AND MAGNETIC FACE
Oliver W. Perin, Jr., 1200 Hollywood Ave.,
Cincinnati, Ohio 45224
Filed Oct. 18, 1965, Ser. No. 496,982
Int. Cl. G01b 11/26, 5/14; G01c 1/00
U.S. Cl. 356—138                                    1 Claim

ABSTRACT OF THE DISCLOSURE

A drilling angle indicator comprises a flat platen having a reflective flat surface and an opposite nether face parallel with said flat surface a fixed pre-magnetized flat magnetic-rubber lamination on the nether face for contact with the workpiece and the platen further having a plurality of different sized substantially round apertures therein remote from the marginal portions of the platen to receive a drill directed through one of the apertures from the reflective surface.

---

The present invention relates to a drilling angle indicator, or tool to aid a mechanic in drilling a hole at right angles to one face of a workpiece.

An object of the invention is to provide a simple and inexpensive, yet accurate tool, for assisting a mechanic in drilling holes in a workpiece, at right angles to face of the workpiece.

Another object of the invention is to provide a tool for the purpose stated, which is convenient to use, and has no moving parts to become lost, damaged, or out of order.

A further object of the invention is to provide a highly durable and effective drilling angle indicator having the advantages above stated, and which may easily be carried and used on the job without careful handling to avoid damage or maladjustment.

The foregoing and other objects are attained by the means described herein and illustrated upon the accompanying drawing, in which.

Figure 1:
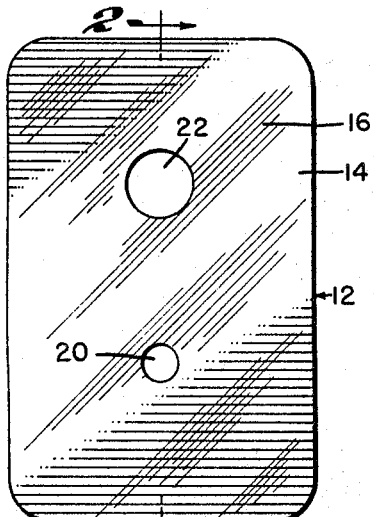
FIG. 1 is a front elevational view of the drilling angle indicator of the invention.
Figure 2:
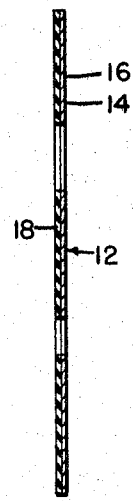
FIG. 2 is a cross-sectional view taken on line 2—2 of FIG. 1.
Figure 3:
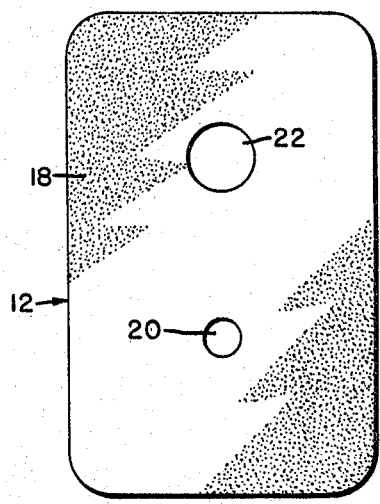
FIG. 3 is a rear elevational view of the same.

In the drawing, the reference character 8 denotes a workpiece to be drilled, using a drill or auger 10 which is rotatable in usual manner. The drilling angle indicator or tool 12, comprises a flat platen 14 having a flat reflective face 16, and an opposite coextensive rear face to which is applied a lamination or backing 18 of friction material to oppose skidding of the platen over the surface of the workpiece.

Figure 4:
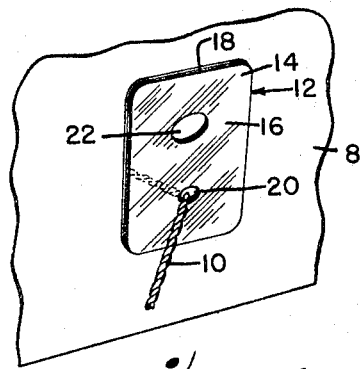
FIGS. 4 and 5 are perspective views showing the indicator in use to indicate, respectively, an improper and a proper angulation of a drill entering a workpiece.
Figure 5:
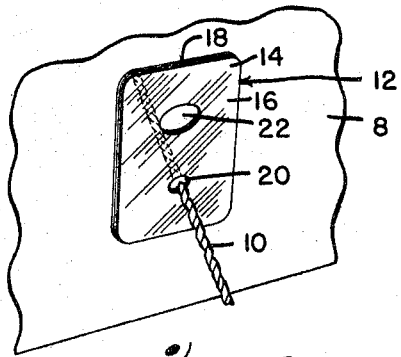

In a preferred embodiment of the invention, the platen 14 is constituted of a flat sheet of metal, for example steel, brass, aluminum or the like, one face 16 of which may be plated and/or highly polished to render it reflective. Thus, as suggested by FIGS. 4 and 5, the reflection of a drill 10 may readily be observed in the reflective face of the platen during the drilling operation. The drilling operation is performed through any one of the apertures 20 or 22 formed in the platen and its backing 18. The number of apertures 20 or 22 may be one or more, and should be ample in size to accommodate drills of various diameters, with substantial clearance.

The lamination or backing 18 may be of magnetic rubber, to hold the platen magnetically against a ferrous metal workpiece. Such lamination or backing, besides being magnetic, possesses the property of adhering to non-magnetic smooth surfaces of workpieces constituted of wood, ceramics, masonry, tile and the like, with a satisfactory degree of tenacity. The lamination or backing, of course, may be of a material which is quite sticky, and which retains its stickiness for an extended period of time notwithstanding repeated usage.

In use, the tool 12 is placed against a workpiece to be drilled, and the point of the drill is inserted through an opening 20 or 22 circumscribing the drilling location. If as in FIG. 5, the drill is held at exact right angles to the face of the workpiece, the reflection of the drill observed in the polished face of platen 12, will be in exact axial alignment with the drill, and the mechanic will know that the drilling operation is proceeding at right angles to the workpiece face.

On the other hand, should the mechanic perform the drilling operation at any angle less than ninety degrees to the workpiece surface, the deviation will at once be observed in the reflection (FIG. 4), at which the reflection of the drill fails to align with the drill itself. Correction is made by changing the drilling angle until the reflection of the drill as in FIG. 5, aligns with the drill axis.

Figure 6:
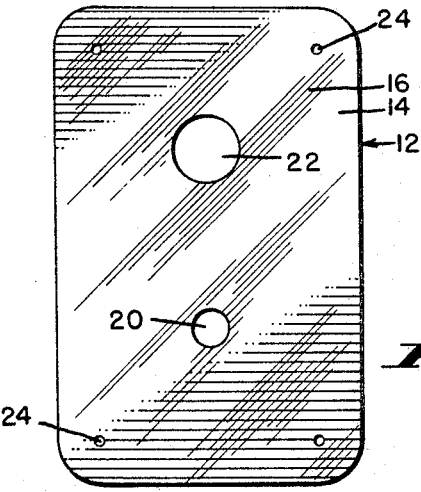
FIG. 6 is front elevational view of a modification.

The modification, FIG. 6, differs from the structure of FIG. 1 only in the provision of small openings 24 near the corners of the platen, to receive thin tacks or brads whereby the tool may be temporarily attached to a workpiece which is receptive of such fasteners.

As used throughout the specification and claims the word drill or drilling is to be broadly construed to include tap or tapping, and the tool may be also used in the performance of various operations other than drilling and tapping, for example, filing, broaching, or reaming, with advantageous results.

It is to be understood that various modifications and changes may be made in the structural details of the device, within the scope of the appended claim, without departing from the spirit of the invention.

What is claimed is:

1. A drilling angle indicator for indicating by reflection any deviation from perpendicularity of a drill penetrating a surface of a workpiece, said indicator comprising: a flat platen having a reflective flat surface, and an opposite nether face, saidsurface and said face being parallel, a fixed pre-magnetized flat magnetic-rubber lamination on said nether face to abut and cling to a ferrous surface of the workpiece to be drilled, the platen having a plurality of different sized substantially round apertures therein remote from the marginal portions of the platen, to receive a drill directed through one of said apertures and onto a surface of the workpiece, and about which said one aperture, an image of the drill and its angularity are observable in the surrounding reflective surface of the platen.

References Cited

UNITED STATES PATENTS

| 735,899 | 8/1903 | Paul | 88—2.2 |
| 1,123,952 | 1/1915 | Swenson | 88—2.2 |
| 2,415,516 | 2/1947 | Monson | 88—2.2 |
| 3,093,919 | 6/1963 | Holtz | 33—107 XR |

JEWELL H. PEDERSEN, *Primary Examiner.*

ORVILLE B. CHEW II, *Assistant Examiner.*

U.S. Cl. X.R.

33—180